US006825478B1

(12) United States Patent
McCarthy et al.

(10) Patent No.: US 6,825,478 B1
(45) Date of Patent: Nov. 30, 2004

(54) MALDI PLATE WITH REMOVABLE MAGNETIC INSERT

(75) Inventors: Robert D. McCarthy, Mayard, MA (US); Kevin M. Hayden, Newton, NH (US); Timothy E. Hutchins, Natick, MA (US); Philip J. Savickas, Franklin, MA (US); Peter C. Cranshaw, Holliston, MA (US)

(73) Assignee: PerSeptive BioSystems, Inc., Framingham, MA (US)

(*) Notice: Subject to any disclaimer, the term of this patent is extended or adjusted under 35 U.S.C. 154(b) by 0 days.

(21) Appl. No.: 10/683,024

(22) Filed: Oct. 10, 2003

(51) Int. Cl.[7] .......................... B01D 59/44; H01J 49/00; G01N 35/00; B01L 3/00

(52) U.S. Cl. .................. 250/440.11; 250/286; 250/288; 73/863.12; 73/864.23; 73/864.34; 73/864.82; 73/864.84; 73/864.91; 73/865.85

(58) Field of Search ................................ 250/282, 286, 250/288, 440.11; 73/863.12, 864.12, 864.23, 864.34, 864.82, 864.84, 864.91, 865.85

(56) References Cited

U.S. PATENT DOCUMENTS

| | | | | | |
|---|---|---|---|---|---|
| 5,498,545 | A | * | 3/1996 | Vestal | 436/47 |
| 5,777,324 | A | * | 7/1998 | Hillenkamp | 250/288 |
| 6,132,684 | A | * | 10/2000 | Marino | 422/104 |
| RE37,485 | E | | 12/2001 | Vestal | |
| 6,414,306 | B1 | * | 7/2002 | Mayer-Posner et al. | 250/288 |
| 6,423,966 | B2 | * | 7/2002 | Hillenkamp et al. | 250/288 |
| 6,508,986 | B1 | * | 1/2003 | Anderson et al. | 422/100 |
| 2003/0057368 | A1 | | 3/2003 | Franzen et al. | |
| 2003/0068614 | A1 | * | 4/2003 | Cima et al. | 435/4 |

FOREIGN PATENT DOCUMENTS

| | | |
|---|---|---|
| GB | 2378755 | 8/2002 |

OTHER PUBLICATIONS

Photographs of device to Sequenom, Inc. on or about May 2000 (3 sheets).

* cited by examiner

*Primary Examiner*—Jack Berman
*Assistant Examiner*—Kalimah Fernandez
(74) *Attorney, Agent, or Firm*—Andrew T. Karnakis

(57) ABSTRACT

A sample plate structure is provided including a retainer plate having a central recess with a trough along its periphery, a sample insert plate which fits into and rests on contact surface of the recess, and a magnet that is held below the contact surface. A portion of the bottom surface of the insert is formed of a magnetic material. The magnet provides sufficient force to retain the insert plate in the retainer plate during MALDI MS analysis. The sample insert plate is provided with a peripheral configuration, which assures that the sample insert plate is properly oriented within the sample plate support structure and is held flat. A hole for a protrusion allows easy insert installation and alignment against the orientation feature in the recess as well as easy removal of the insert simply by pushing up from underneath the retainer plate. While the insert sample plate can be a consumable, the remaining portion of the apparatus can be reused.

8 Claims, 1 Drawing Sheet

MALDI PLATE WITH REMOVABLE MAGNETIC INSERT

BACKGROUND

The present technology relates to a plate useful in mass spectroscopy such as matrix-assisted laser desorption ionization (MALDI) analysis and more particularly to a MALDI plate having a removable insert for supporting samples to be analyzed.

For the analysis of large molecules such as biomolecules, MALDI mass spectrometry has become a standard method. MALDI mass spectrometry has typically used expensive electrically conductive plates having high flatness tolerances to introduce chemical samples to the mass spectrometer (MS) instrument. This requirement for the plate surfaces to be extremely flat is due primarily to the need for the plate to become an integral part of the mass spectrometer to enhance signal resolution and mass accuracy of measurements made during the MALDI analysis. Current manufacturing practices prohibit making these plates cost effective enough to render them disposable. Therefore, the user is required to utilize laborious cleaning steps accompanied by the exercise of stringent quality control procedures to eliminate sample carryover from one analytical procedure to the next. Additionally, limited space in the ion source and the application of high voltage fields reduce the number of possible technology solutions for producing inexpensive single use plates. Archiving of sample plates containing precious samples for possible re-analysis also necessitates a relatively low cost plate. Furthermore, users are currently unable to cost effectively introduce into the MALDI MS special plate materials or surface chemistry for experimentation. For such experiments, it is common practice to attach trial materials such as membranes or tissue slices on top of current plates for analysis. This practice sometimes causes instrument instability and vacuum problems, and changes instrument optimization, rendering reproducible MS results far more difficult. Accordingly, it would be desirable to provide a sample plate for use in MALDI MS that is sufficiently cost effective to permit its use as a consumable. Such a sample plate would permit a onetime use of the plate thereby eliminating the need to clean the plate and the need for quality control checking of collected data Having a disposable plate thus ensures no carryover of analyte signals from a previous analysis for which the plate was used, while permitting multiple uses of a sample plate support structure.

SUMMARY

In accordance with the present teachings, a MALDI sample plate structure is provided with a removable insert. The plate structure comprises a retainer plate having a central recess or "pocket" portion which is shaped to accept a sample plate insert which supports the analyte/matrix mixture. A portion or all of the bottom surface of the insert is formed of a magnetic material. The retainer plate is provided with a magnet suitable to provide sufficient force to retain the insert in the plate during MALDI MS analysis. In various embodiments the sample plate insert is configured to retain a plurality of samples and can be archived or discarded following a single use. In various embodiments, the sample plate can be coated with hydrophobic materials or uncoated. In various embodiments, the plate insert is disposable, and the retainer plate can be reused with additional sample plate inserts having different surface configurations, if desired.

DESCRIPTION OF VARIOUS EMBODIMENTS

Figure 1:
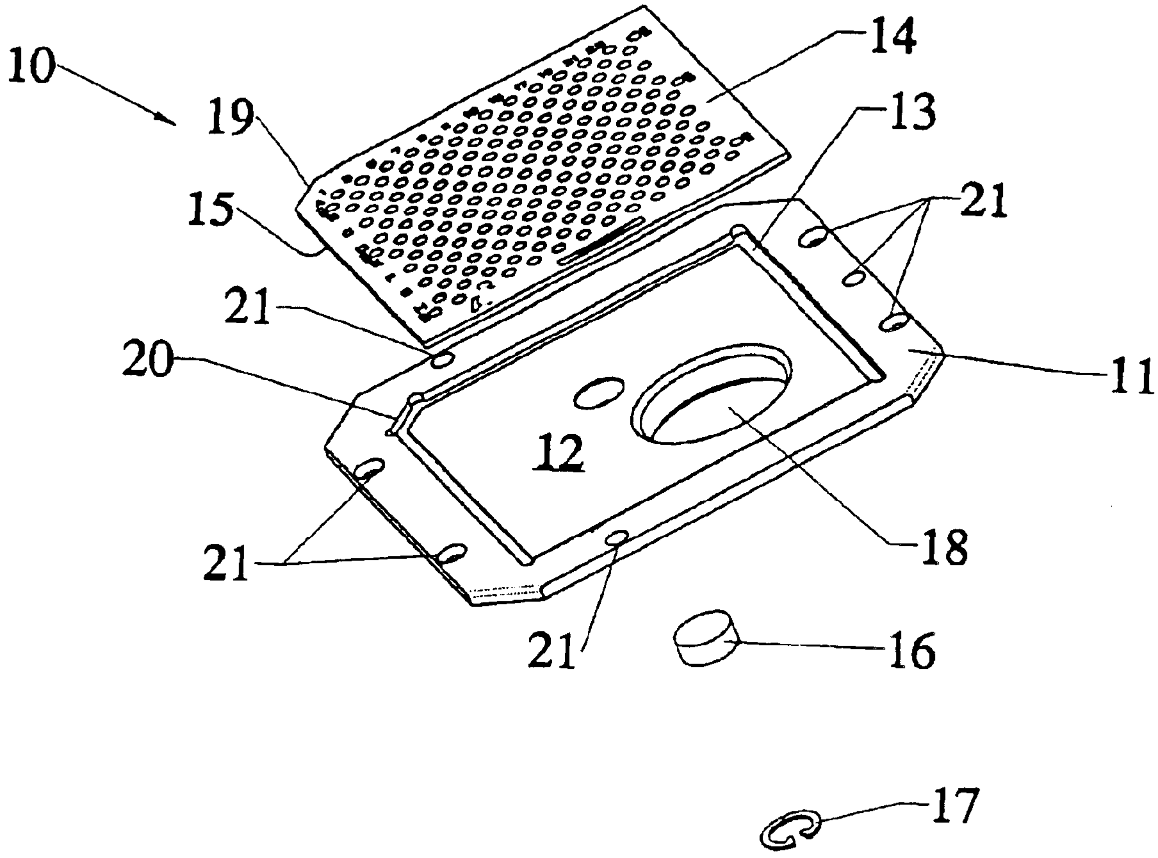
FIG. 1 is an exploded view of one embodiment of this invention.

The present teachings provide a single use sample insert plate and a reusable sample plate support structure for retaining the insert plate that can be used in MALDI MS analysis. By MALDI MS analysis we mean both mass analysis and tandem mass analysis, the latter often referred to as MS/MS or $MS^n$ analysis. The sample plate is electrically conductive and at least a portion of the bottom surface includes a magnetic material. The sample insert plate can be metal such as a metal formed of magnetic material that can be easily worked in a cost effective manner, such as by stamping or the like. Representative suitable metals for forming the sample insert plate can be stainless steel, aluminum or gold-coated steel and other metal plated substrates such as nickel plated aluminum and the like. Alternatively, the sample insert plate can be formed of an electrically conductive non-metal composition such as silicon, metal-coated or conductive glass, doped substrates or the like having a magnetic material formed on at least a portion of the bottom surface of the disposable sample insert plate. In various embodiments a stainless steel disposable sample insert plate can be made of magnetic 400 series stainless steel.

The sample insert plate is provided with a peripheral configuration, which assures that the sample insert plate is properly positioned within the sample plate support structure and is held flat. By so-configuring the sample insert plate, assurance is provided that the samples can be analyzed in series while being correctly identified with a source from which the sample is obtained. This, in turn, permits matching of the sample analysis with the source of the sample, such as a particular human patient. The sample plate can also be provided with a particular surface configuration or surface chemistry that serves to properly position and isolate individual samples after depositing a plurality of samples on the sample plate while avoiding mixing of samples. In various embodiments indentations or markings can be created on the sample insert plate to isolate samples. Alternatively, the sample plate can be coated with a hydrophobic material such as paraffin, lipids, waxes, silicon oils or the like that prevent an aqueous sample from migrating from the sample area as described in U.S. patent application Ser. No. 10/277,088, commonly assigned, whose disclosure is incorporated by reference herein. Any other known techniques for isolating samples on a sample plate can be utilized.

The sample plate support structure comprises a holder or retainer plate with a recess that provides unique orientation of the sample insert plate, with precise location against two of the four sides of the recess. The upper surface of the recess provides a contact surface for the inserted sample plate and is configured to provide a flat and fixed height of the sample insert plate when inserted within the recess. The periphery of the open recess is configured to accept the sample insert plate in only one orientation so that the sequence of samples being analyzed is always determined, and, if desired, a given sample can be re-analyzed correctly. By this configuration the sample being analyzed always can be matched to the correct source of the sample. The retainer plate can be provided with a series of holes to allow transportation and registration alignment of the retainer plate and sample insert plate within the mass spectrometer via the MALDI MS plate loading mechanism as is well known by those of skill in the art.

In various embodiments the depth of the recess and the thickness of the sample insert plate are matched such that the faces of the sample insert plate and top of the retainer plate structure are flush with each other. Instrument tuning of this configuration is most similar to that when a standard re-usable flat plate is used for sample analysis.

In various embodiments the retainer plate can be provided with a trough machined below the contact surface along the periphery of the recess. Incorporating such a feature provides tolerance for slight edge imperfections (such as burrs) around the periphery of the sample insert plate that would otherwise tend to tilt the sample insert plate in the retainer plate thereby compromising the MALDI MS analysis.

Referring to FIG. 1, the sample plate construction 10 includes a retainer plate 11 with an open recess 12, a sample insert plate 14 having a bottom surface 15 made of a material that is attracted to a magnet and a magnet 16. The magnet 16 is retained within hole of retainer plate 11 by spring loaded retaining clip 17. Holder 11 is provided with hole 18 through which a protrusion such as a finger of a user can be inserted either to remove the sample insert plate 14 from retainer plate 11 or to accurately position the sample insert plate 14 within the retainer plate 11 through contact only with the bottom surface of plate 14. In this way, proper alignment and adjustment can be achieved without touching samples to be analyzed. Holder 11 can also be provided with a trough 13 along the entire periphery of the recess 12. The trough 13 assures flat and flush registration of the sample plate 14 in the recess 12 even when slight imperfections are present on the edges of the sample insert plate 14.

The sample insert plate 14 can be provided with a chamfered corner 19 which aligns with chamfered corner 20 of retainer plate 11. The chamfered corners 19 and 20 assure that sample insert plate 14 is properly positioned to provide correct sequence of samples being analyzed as previously discussed. A typical number of sample spots on sample insert plate can be 96, 192 or 384, matching patterns from industry standard sample storage devices.

In various embodiments the sample insert plate 14 uses the orientation feature provided by the chamfered corner 19 to maintain location, orientation and allow registration of discrete spots and sample tracks that are deposited from liquid chromatography-MALDI (LC MALDI) deposition robots as samples to be analyzed in the MALDI instrument.

In various embodiments, the sample insert uses this orientation feature provided by the chamfered corner 19 to maintain location, orientation and allow registration of samples other than discrete spots as samples for analysis by MALDI instruments, such as membranes, tissue slices or other technologies used to separate or capture biomolecules for mass spectrometry analysis.

Holes 21 can be precisely, with high tolerance, machined in retainer plate 11 to enable transport (such as by a gripper) and registration of the sample plate construction 10 within the MALDI MS as is known by those of skill in the art.

What is claimed is:

1. A sample support structure that comprises:

a retainer plate having a central recess shaped to accept a sample insert plate;

a sample insert plate having a surface configured to retain a plurality of samples and having a peripheral surface shaped to fit within said central recess in only one orientation, said sample insert plate having a bottom surface at least a portion of which is formed of a magnetic material; and a magnet attached to said retainer plate through a hole in said retainer plate.

2. The structure of claim 1 which includes a hole in said recess large enough to permit insertion of a protrusion therein.

3. The structure of claim 1 wherein an internal periphery of said retainer plate includes a trough.

4. The structure of claim 2 wherein an internal periphery of said retainer plate includes a trough.

5. The structure of claim 1 in which the peripheral surface of the sample insert plate includes a chamfered corner that is matched to a chamfered corner in said recess.

6. The structure of claim 2 in which the peripheral surface of the sample insert plate includes a chamfered corner that is matched to a chamfered corner in said recess.

7. The structure of claim 1 wherein the sample insert plate is a MALDI sample plate for MALDI MS analysis.

8. The structure of claim 2 wherein the sample insert plate is a MALDI sample plate for MALDI MS analysis.

* * * * *